Dec. 17, 1935.  E. W. GENT  2,024,571
FLOW METER
Filed Jan. 10, 1934
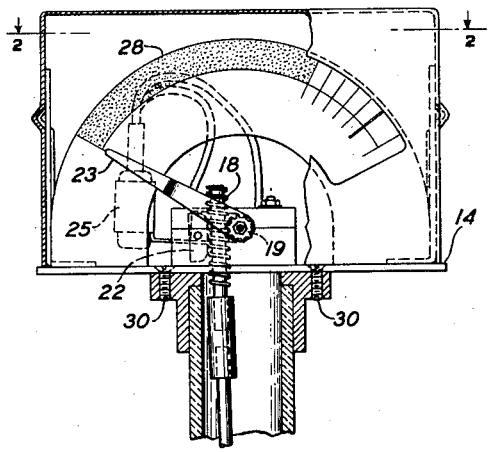
FIG. 2
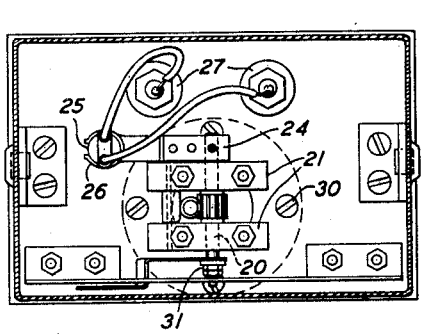
FIG. 1
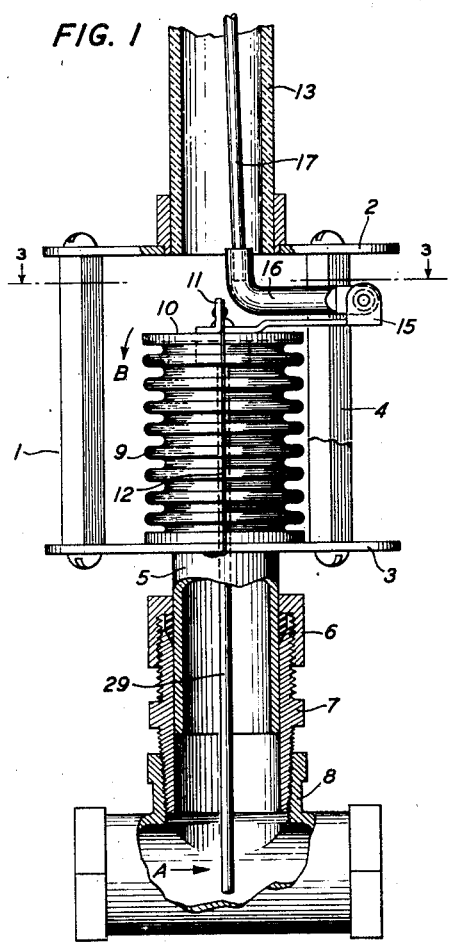
FIG. 3
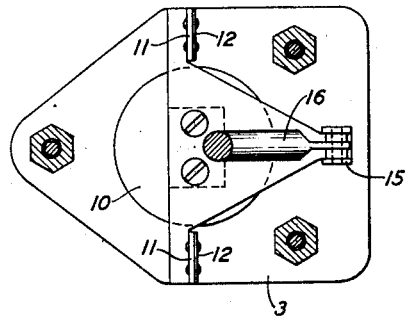
INVENTOR
E. W. GENT
BY
G. H. Stevenson
ATTORNEY Patented Dec. 17, 1935

2,024,571

UNITED STATES PATENT OFFICE 2,024,571

FLOW METER

Edgar W. Gent, Morristown, N. J., assignor to Bell Telephone Laboratories, Incorporated, New York, N. Y., a corporation of New York Application January 10, 1934, Serial No. 706,023

2 Claims. (Cl. 73—167)

This invention relates to fluid flow indicators and particularly to combined fluid flow indicators and relays.

An object of the invention is to provide a fluid flow meter which is simple and economical in construction and which offers little resistance to the fluid flow.

A further object of the invention is to provide a means for controlling an electrical circuit by a switch connected to the flow meter, so that if the volume of fluid being metered exceeds a predetermined maximum or falls below a certain minimum, indication may be made or apparatus controlled at some remote point.

In a specific preferred embodiment of the invention the fluid flow is measured by the force it exerts on a rod of circular cross-section projecting into the fluid conduit transversely to the direction of flow. The rod is supported by having its outer end attached to a plate closing one end of a metallic bellows, the other end of which is sealed to the conduit around the aperture through which the rod projects. In this way, the metallic bellows acts both as a fluid seal and as a resilient support for the rod. A pair of flexible metallic strips each having one end attached to the bellows closure plate and the other end to the conduit, prevents the expansion of the bellows under the influence of the fluid pressure while not interfering with the bending action thereof. A lever system attached to the bellows closure plate actuates an indicating arm and relay contacts.

The preferred form of the invention is delineated on the accompanying drawing to which reference is made hereinafter by numerals which designate corresponding parts throughout.

Fig. 1 is a sectional elevation of the flow meter.

Fig. 2 is a sectional view taken on the line 2—2 of Fig. 1.

Fig. 3 is a sectional view taken on the line 3—3 of Fig. 1.

The device consists of a supporting structure I consisting of top and bottom plates 2 and 3 rigidly tied together by spacer rods 4. Attached to the bottom plate 3 is the pipe 5 which, by means of stuffing nut 6 and threaded bushing 7, is fastened to pipe T 8 which is so connected in a pipe line (not shown) that the fluid to be metered flows through as indicated by the arrow A.

A corrugated metal tubular bellows 9 is rigidly fastened at its lower end to plate 3, opening into and hermetically sealed to the upper end of the pipe 5. The top of the bellows is closed by a plate 10 to which are attached two angle lugs 11 which serve as the fastenings for the upper ends of two flexible metallic strips 12, the lower extremities of which are rigidly attached to plate 3. The upper plate 2 of the structure serves to support the tube 13 on the upper end of which is mounted the housing 14 for the indicating and control mechanism.

The bellows closure plate 10 is provided with a lever arm 15 whose extremity is pivotally connected to a link 16 which in turn forms a socket for the connecting rod 17 running to the indicating mechanism. Attached to the upper extremity of this rod is a worm 18 which is meshed with the teeth of the pinion gear 19 which is free to rotate with its pivot 20 in bearing blocks 21. A guide shoe 22 is held against the back of worm 18 so that it will be held in proper engagement with its pinion gear at all times during its vertical motion and restrained from sideways movement.

The pivot of pinion gear 19 extends beyond the journal boxes 21 and has attached to one extremity, a pointer 23, and to the other, a lever arm 24, which holds a mercury switch 25 by means of spring clips 26 at its extremity. The electrical leads from this switch are connected to binding posts 27. A suitably calibrated dial 28 is mounted so that the pointer 23 sweeps in front of it.

Rigidly attached to the under-surface of the bellows closure plate 10 is the rod 29 extending down through the interior of the bellows 9 and tube 5, so that its lower portion lies in the path of the fluid whose volume, as it passes through T 8, is to be measured.

The operation of the flow meter is as follows: The rod 29, extending as it does into the stream to be measured, is subject to the dynamic pressure resulting from the motion of the fluid. The upper end of this rod, being rigidly attached to the plate 10 on the top of the flexible bellows 9, exerts a force tending to bend the bellows in the direction indicated by arrow B. The bellows is subject also to the static pressure of the fluid but is constrained from the longitudinal expansion which would result from this pressure by the two flexible metal straps 12. These straps, while preventing longitudinal motion, permit the bellow to yield to the bending action of rod 29, and the lever arm, link and gear system 15, 16, 17, 18, 19, transforms this tilting motion of the closure plate 10 into a rotary motion for moving the indicating pointer 23. It is apparent that the greater the volume of fluid passing through the T 8 in a unit of time, the greater will be its velocity and hence the greater the dynamic pressure tending to deflect the rod 29. The bellows 9, being a corrugated sheet metal tube substantially as delineated, may be made to suffer considerable bending before its elastic limit is reached and will thus return to its initial position if the fluid ceases to flow and hence to exert dynamic pressure against the rod 29. This deflection of the bellows when transmitted to the pointer, as described, will therefore indicate accurately on a dial, suitably calibrated, the volume of fluid flowing.

Since longitudinal motion of the bellows due to static pressure is prevented, the flow meter may be used to continuously indicate the volume of a flowing fluid without regard to its static pressure and may, therefore, be relied upon for accuracy in those applications where the static pressure may be intermittently or continuously variable. The deflection of the bellows, as described, being springlike in its nature is practically frictionless and this contributes to the accuracy of indication.

With a bellows 9 of any given spring characteristics, a wide range of volumes may be indicated. The amount by which the rod 29 extends into the moving fluid is adjustable by loosening stuffing nut 6 which permits the whole instrument to be slid up or down relative to T 8. The farther the rod extends into the fluid, the greater becomes the force acting upon it for a given velocity of fluid. For a wide range of volume indication, it is therefore necessary only to change the amount by which rod 29 projects into the fluid and provide a dial 28 suitably calibrated.

The operation of the electrical relay component part of this flow indicator operates as follows:

Since the pivot 20 actuating the pointer 13, whose motion is effected as described, carries also the lever arm 24, rotation of the pivot will move the electrical mercury switch 25 in an arc. The preferred form for this switch is the enclosed mercury globule type. When rotation has proceeded through slightly more than 90 degrees from the position shown in Fig. 1, the construction of the switch is such that the mercury globule therein will flow to the opposite end of the tube containing it. The electrical conducting property of the mercury is utilized and thus the electrodes immersed in it are, in effect, a closed switch which will be opened by the mercury flowing away from the electrodes. Dependent upon which end of the tube the electrodes are inserted in and the number thereof, rotation in a clockwise direction may be made to open or close an electrical circuit or perform other electrical switching operations. This electrical relay action may be applied to the remote and automatic control of motors, circuit breakers, etc., by such electrical circuits as are well known in the art.

Since it is a frequent occurrence that the electical potential difference between the piping and the switch contacts is very high, the supporting sleeve 13 and connecting rod 17 may be made of insulating materials and of such length that the potential differences met in electrical practice may be properly isolated.

It is sometimes desirable that the indicating dial 28 face in a direction different than that shown on the drawing. Removing screws 30 permits plate 14 with its associated mechanism to be rotated about the axis of supporting sleeve 13. With the four screws shown, the dial may be made to face in any quadrant.

It will be noted that in rotating this mechanism pinion 19 will remain in mesh with worm 18 and that motion of the pointer 23 will result from the screw action of the worm 18 on pinion 19. It will then be necessary to readjust the pointer for zero position which may be readily accomplished by loosening clamping nuts 31, returning the pointer to zero by slipping it on its shaft and fixing it in this position by tightening the nuts 31.

What is claimed is:

1. In combination a fluid conduit, a rod-like vane member projecting into said conduit, a metallic bellows sealed at one end to the conduit, a plate sealing the other end of said bellows and supporting said vane member, and means for preventing said bellows from expanding while permitting the lateral movement thereof in response to the dynamic pressure on said vane member.

2. A flow indicator comprising a fluid conduit, a metallic bellows sealed at one end to the conduit, flexible metallic strips attached to the conduit and to the bellows to prevent the expansion of the bellows under the effects of fluid pressure in said conduit while permitting the lateral movement thereof in a direction parallel to the direction of flow through the conduit, a plate closing the free end of the bellows, a rod mounted in said bellows and having one end attached to said plate and the other end extending into the conduit, means for adjusting the length of the portion of said rod extending into the conduit, and indicating means operated by the movement of the free end of the bellows.

EDGAR W. GENT.